2 Sheets—Sheet 1.

A. L. DEWEY.

TREADLE-MOTION

No. 7,161.

Reissued June 6, 1876.

WITNESSES

Wm A Skinkle

L. Stall

INVENTOR

Albert L. Dewey.

By his Attorney

Wm D. Baldwin.

N. PETERS, PHOTO-LITHOGRAPHER, WASHINGTON, D. C.

A. L. DEWEY.

TREADLE-MOTION

No. 7,161. Reissued June 6, 1876.

WITNESSES

Wm A Skinkle
F. Stich

INVENTOR

Albert L. Dewey

By his Attorney

Wm D. Baldwin

N. PETERS, PHOTO-LITHOGRAPHER, WASHINGTON, D. C.

UNITED STATES PATENT OFFICE.

ALBERT L. DEWEY, OF WESTFIELD, MASSACHUSETTS, ASSIGNOR TO FRANCIS A. BURNHAM, OF PAWTUCKET, RHODE ISLAND.

IMPROVEMENT IN TREADLE-MOTIONS.

Specification forming part of Letters Patent No. 47,282, dated April 18, 1865; reissue No. 7,161, dated June 6, 1876; application filed May 17, 1876.

*To all whom it may concern:*

Be it known that I, ALBERT L. DEWEY, of Westfield, in the county of Hampden and State of Massachusetts, have invented a new and useful Treadle-Motion, of which the following is a specification:

My invention relates to a treadle-motion for turning-lathes, sewing-machines, and other devices to which motion is imparted through the medium of a foot-treadle. Its object is automatically to raise the treadle after each depression thereof, in readiness to commence the next succeeding downward movement.

The subject-matter claimed hereinafter specifically will be designated.

Figure 1:
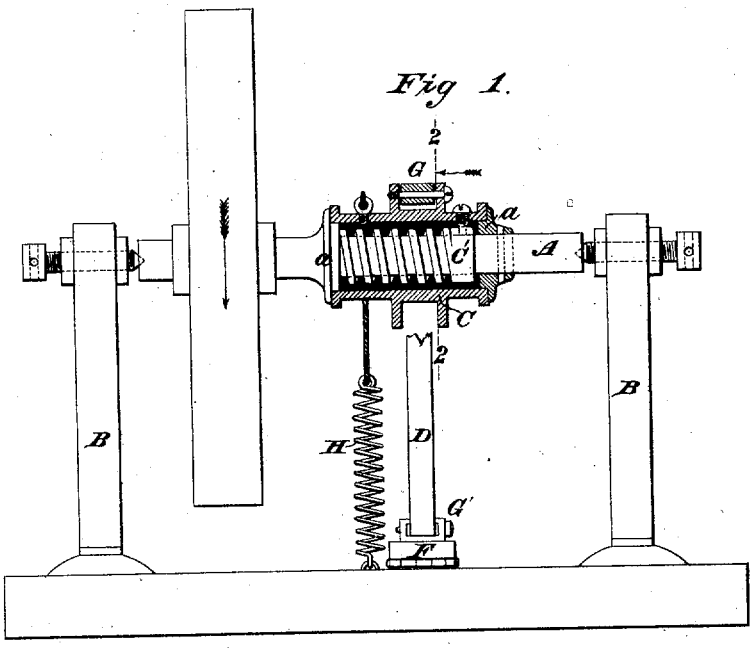
Figure 2:
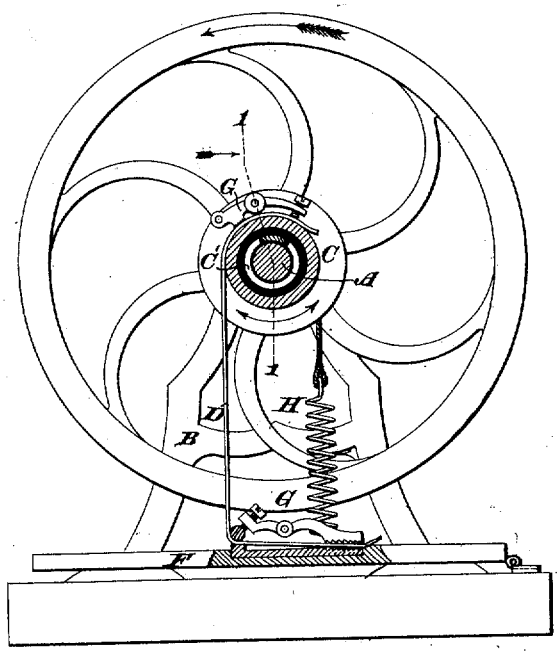
Figure 3:
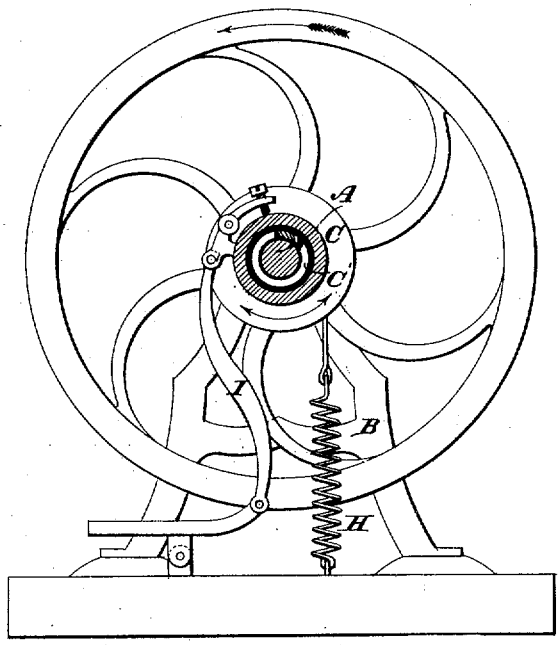
Figure 4:
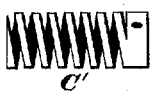

In the accompanying drawings, Figure 1 is a vertical central section through my apparatus on the line 1 1 of Fig. 2; Fig. 2, a transverse section of the same, on the line 2 2 of Fig. 1; Fig. 3, a similar view of a modification of my apparatus; and Fig. 4, a detached view of a clutch-spring adapted to my invention.

A shaft, A, suitably mounted in a frame, B, carries a loose hub or pulley, C, lateral movement of which is prevented by bosses *a a* in recesses or rabbets of which it has its bearings. Within this hub or pulley, and upon the shaft, is mounted a spiral clutch-spring, C, (the construction of which is clearly shown in Fig. 4,) one end of which is connected with said hub, while its opposite end remains free or disconnected. The hub or pulley is provided with flanges, or the usual belt-groove, within which one end of a belt, D, is secured, the belt being wound one or more times around the pulley, and its opposite end is then connected to the treadle F. The ends of the belt are secured, respectively, to the pulley and treadle—in this instance by pivoted clamps G G′, the construction of which will clearly be understood from the drawing. A reacting-spring, H, is connected with the pulley—in this instance by a cord or chain—in such a manner as to act upon it in a direction the reverse of the treadle-belt, so that when the treadle is depressed and the pressure removed, the tension of the spring will return the treadle to its normal position.

The operation of the device is as follows: In the normal position of the parts, the belt is wound upon the pulley, the treadle is raised, the clutch-spring is in a relaxed state, and no tension is exerted upon the pulley by the retracting-string. As the treadle is depressed under the action of the operator's foot, the belt is unwound from the hub or pulley, revolving it in the direction indicated by the arrow in Fig. 2, which revolution contracts the friction-spring upon the shaft, clutching it and the pulley together, and consequently the two rotate together. By this forward action of the pulley, the tension of the spring is accumulated, which, as soon as the pressure upon the treadle is removed, (which allows the clutch-spring to relax and the shaft to continue its movement,) causes the pulley or hub to turn in the opoosite direction, and rewind the treadle-belt thereon to elevate the treadle to its normal position in readiness for the next succeeding downward movement.

It will thus be seen by my invention, that the hub or pulley around which the treadle-belt passes is clutched with the shaft in one direction of its revolution, while it is free to rotate in the opposite direction to restore the treadle to its normal position without hinderance to the forward rotation of the shaft, which is provided with the usual balance-wheel.

In certain cases I substitute for the belt F a pitman-rod, I, in which case the spring for retracting the hub or pulley and treadle is not absolutely necessary.

I claim as of my own invention—

1. The combination, substantially as hereinbefore set forth, in a treadle-motion, of a rotating shaft, a loose-pulley thereon, a coiled spring-clutch connecting the pulley and shaft, and a treadle for actuating the pulley, whereby the shaft is allowed to continue its rotation during the backward movement of the pulley.

2. The combination, substantially as hereinbefore set forth, in a treadle-motion, of a rotating shaft, a loose pulley thereon, a clutch connecting the pulley and shaft, a treadle for rotating the pulley in one direction, and a spring acting in opposition to the treadle to return the pulley and treadle to their normal position to commence the next downward movement.

ALBERT L. DEWEY.

Witnesses:

HENRY FULLER,
CHARLES L. BROWN.